United States Patent [19]

Lepert et al.

[11] Patent Number: 4,892,905

[45] Date of Patent: * Jan. 9, 1990

[54] ADHESIVE EMULSION

[75] Inventors: Andre Lepert, Allouville Bellefosse, France; Morris L. Evans, Baton Rouge, La.; Lutz E. Jacob, Wezembeek-Oppem, Belgium

[73] Assignee: Exxon Research & Engineering Company, Florham Park, N.J.

[*] Notice: The portion of the term of this patent subsequent to Nov. 18, 2003 has been disclaimed.

[21] Appl. No.: 160,980

[22] Filed: Feb. 26, 1988

Related U.S. Application Data

[62] Division of Ser. No. 899,185, Aug. 18, 1986, Pat. No. 4,766,169, which is a division of Ser. No. 717,980, Mar. 28, 1985, Pat. No. 4,633,698.

[30] Foreign Application Priority Data

Mar. 28, 1984 [GB] United Kingdom ............... 84-07984

[51] Int. Cl.$^4$ .................. C08J 3/04; C08L 33/02; C08L 57/00
[52] U.S. Cl. .................. 524/499; 524/475; 524/501; 525/221
[58] Field of Search ............... 525/221; 524/475, 499, 524/501

[56] References Cited

U.S. PATENT DOCUMENTS 4,623,698 11/1986 Jacob et al. .................. 525/221

Primary Examiner—Jacob Ziegler
Attorney, Agent, or Firm—J. F. Hunt

[57] ABSTRACT

Petroleum resins having a softening point from 10° C. to 80° C. obtained from C$_5$ olefins and diolefines and one or more monovinyl aromatic compounds which contain from 10 to 30 wt. % of the aromatic are useful as tackifiers for carboxylated styrene butadiene copolymer to produce pressure sensitive additives especially aqueous based adhesive when the resin is in the form of an emulsion which is also claimed.

5 Claims, No Drawings

ADHESIVE EMULSION

This is a division of application Ser. No. 899,185, filed 8/18/86, now U.S. Pat. No. 4 766 169, which is a divisional of U.S. Ser. No 717,980 filed 3/28/85 based on U.K. No. 84-07984, now U.S. Pat. No. 4633698.

The present invention relates to pressure sensitive adhesives comprising a synthetic latex and a tackifier resin and an emulsion of the tackifying resin.

Pressure sensitive adhesives are, among other applications, used in the tape and label field. A pressure sensitive adhesive may be used in a number of applications such as masking tape, electrical tape and medicinal tapes for holding dressings and the like in place. The term label covers a broad range of products and includes items such as price tags in the supermarket and labels on glass or plastic containers. In the case of "labels" two types of bonding are required namely permanent and removable. Permanent bonding is required for items such as labels on glass or plastic containers when the life of the label will be relatively long. Removable bonding is desirable for items such as price tags and peelable tape.

Pressure sensitive adhesives should have a high initial tack so that the adhesive surface merely needs to be contacted and pressed to a substrate to achieve bonding. There should be little or no requirement to hold the adhesive and substrate in position for any significant time while a bond develops. Depending upon the strength of adhesion required the bonding force of the adhesive may increase with time to provide a relatively permanent bond.

It is known to prepare at least three different types of adhesives using natural or synthetic tackifiers, natural or synthetic resins, or blends thereof, namely, hot melt adhesives, solution adhesives and aqueous based adhesives. Hot melt adhesives are made from a blend of resins and are normally solid at room temperature. Hot melt adhesives require an elevated temperature for application to a substrate necessitating some type of hot melt gun. Solution adhesives such as those described in U.S. Pat. No. 4,048,124 do not suffer from this drawback. These adhesives comprise a solution of a tackifier resin or a blend of tackifier resins in a low boiling hydrocarbon solvent. When the adhesive is applied to a substrate the solvent evaporates. Due to environmental concerns and the rising cost of hydrocarbon solvent there has been an increasing need to reduce or eliminate the hydrocarbon solvent in such adhesives. Accordingly, the adhesive industry is seeking improved aqueous based adhesive compositions. Existing aqueous based adhesive compositions usually comprise a natural or a synthetic latex in admixture with cellulose materials such as starch or natural or synthetic tackifier resins.

U.S. Pat. No. 4,189,419 to Avery International discloses a pressure sensitive adhesive comprising from about 50 to 60% by weight on a dry basis of a tackifier and from about 50 to 40% by weight on a dry basis of a carboxylated styrene butadiene polymer (SBR).

A paper entitled "Styrene Butadiene Latexes for Adhesive Applications" by Robert G. Kahn of Dow Chemical, published in Adhesives Age, December of 1977 discloses a similar pressure sensitive adhesive composition which also contains butyl benzyl phthalate, as a "plasticizer". While the amount of platicizer is relatively small the plasticizer comprises a hydrocarbon phase in the adhesive and the composition is not entirely aqueous based.

U.S. Pat. No. 4,179,415 issued Dec. 18, 1979, to Johnson and Johnson discloses a substantially aqueous based adhesive composition containing a latex having a high proportion of isoprene.

United Kingdom patent application No. 2097410A discloses novel pressure sensitive adhesives comprising a latex of a polymer and a tackifier resin the polymer being obtained from particular amounts of vinyl or vinylidene aromatic monomers and $C_4$-$C_8$ conjugated diene monomers and an unsaturated carboxylic acid. Similarly European patent application publication No. 0062343 A2 discloses a latex of a copolymer obtained from a hard monomer such as styrene, a soft monomer such as butadiene and an unsaturated acid which may be blended with a tackifying resin to produce a formulation useful as a pressure sensitive adhesive.

Various resinous materials have been suggested as tackifiers for these latices. Examples of materials suggested include emulsified rosin, partially decarboxylated rosin, glyceryl esters of polymerised rosin, partially dimerised rosin, natural resins, hydrogenated wood rosin, plasticised hydrogenated rosin, aliphatic hydrocarbon resins from petroleum, aromatic petroleum resins, EVA, terpene/phenol resins, cumarone/indene resins, rosin esters, pentaerythritol esters and polydicylopentadiene resins.

In developing adhesive formulations one seeks the optimum combination of several adhesive properties and since it is not generally possible to achieve the optimum for every property it is necessary to obtain the best balance of properties for the particular use in mind. For pressure sensitive adhesives for use in the label industry one tries to optimise the loop tack and ball tack and at the same time provide an adhesive whose component will not migrate during storage leading to unsightly colouring and lowering of adhesive properties. Although the improved loop tack and ball tack can be provided by the tackifier resins of the type described above we have found that those tackifiers which provide such tack for example hydrogenated rosins such as Staybelite ester 10 and modified rosins such as Snowhite 52CF tend to migrate.

It has been generally suggested in United Kingdom patent application No. 2097410A and European Patent application No. 0062343 that petroleum hydrocarbon resins such as those manufactured from a $C_9$ cut of a aromatic hydrocarbon stream or a $C_5$ cut of an aliphatic or cycloaliphatic hydrocarbon stream are useful as tackifiers. There is however no suggestion of the particular type of resin that should be used and indeed many of the resins falling within such broad descriptions are unsuitable for tackification of carboxylated styrene/butadiene lattices. Our European Patent Application No. 83300001.1 describes certain resin emulsions which may be used to tackify carboxylated styrene/butadiene rubbers but such resins have not been found to provide optimum adhesive properties and the present invention provides a further improvement in such tackifiers.

The present invention therefore provides the use as a tackifier for carboxylated styrene butadiene copolymers of a resin having a softening point from 10° C. to 80° C. being a copolymer of a feed which is predominantly $C_5$ olefines and diolefines and one or more monovinyl aromatic compounds containing from 10 to 30 wt. % of the monovinyl aromatic compounds.

The invention further provides a pressure sensitive adhesive comprising from 30% to 85% by weight of a carboxylated styrene butadiene copolymer and from 15% to 70% by weight of a resin having a softening point from 10° C. to 80° C. being a copolymer of a feed which is predominantly $C_5$ olefines and diolefines and one or more monovinyl aromatic compounds containing from 10 to 30 wt. % of the monovinyl aromatic compounds.

In a further embodiment the present invention provides an aqueous emulsion containing from 40% to 70% by weight of a resin having a softening point from 10° C. to 80° C. being a copolymer of a feed which is predominantly $C_5$ olefines and diolefines and one or more monovinyl aromatic compounds containing from 10 to 30 wt. % of the monovinyl aromatic compounds.

Carboxylated SBR emulsions with which the resins are used in the adhesives of the present invention are commercially available from numerous suppliers. The processes for the production of these carboxylated SBR emulsions are discussed in U.S. Pat. No. 3,966,661. In brief the carboxylated SBR emulsions may be made by emulsion polymerisation of butadiene, styrene and one or more unsaturated acids (for example acrylic, methacrylic, crotonic, maleic, fumaric, itaconic and 3-butene 1,2,3 carboxylic acids). If desired substituted monocarboxylic acids and substituted polycarboxylic acids may be used. The quantity of carboxylic acid used, based on total monomer is about 0.5 to 5% w/w. Preferably the carboxylated SBR contains at least 1% w/w of the said carboxylic acid monomers. For example, it is preferred that it should contain about 1 to 5% w/w of the carboxylic monomer. The unsaturated acids may be ethylenically unsaturated monocarboxylic acids or polycarboxylic acids or mixtures thereof. Preferably they contain 2 to 10 carbon atoms. The invention is particularly useful with materials such as those described in United Kingdom Patent 2097410 and European patent application 0062343 and the material originally available from Polysar as D93-703 and now commercially available as PL-3703.

The carboxylated SBR used to make the emulsion preferably has not more than 50% w/w of bound styrene. For example it contains 20 to 50% w/w, preferably 35 to 50% w/w of bound styrene. If the bound styrene content of the SBR is less than 20% w/w the bond strength of the resulting pressure sensitive adhesive product is reduced to an unacceptable extent and conversely if it exceeds about 50% w/w the tack on the resulting adhesive is reduced.

In the SBR an anionic or ninionic emulsifier is desirably present. Anionic emulsifiers are desirable in order to obtain high mechanical stability under the high shear conditions which are apt to occur in certain types of pumping and coating equipment. Particularly suitable examples are synthetic anionic emulsifiers such as alkaline metal soaps of rosin acids. It is well known rosin is a natural product obtained from pine trees and is a product extracted either from the growing tree or from the stump. The main constituents of rosin are abietic acid and premaric acid type resin acids which have the general formula $C_{19}H_{29}COOH$ and contain the phenanthrene nucleus.

The resins used as tackifier according to the present invention are prepared by the polymerisation of a mixture of a petroleum cracked distillate generally boiling in the range 25° C. to 80° C. and a monovinyl aromatic monomer in the proportions to yield a resin containing from 10 to 30 wt. % of the monovinyl aromatic compound as determined by Nuclear Magnetic Resonance analysis. The petroleum cracked distillate comprises a mixture of saturated and unsaturated monomers the unsaturated monomers being mono-olefines and diolefines and although the unsaturated materials are predominantly $C_5$ some higher and lower materials such as $C_6$ olefines and diolefines may be present. The distillate may also contain saturated or aromatic materials which can act as polymerisation solvent.

The preferred monovinyl aroamtic monomer is styrene which may be substituted in the aromatic group. Alternatively $\alpha$,methyl styrene or vinyl toluene may be used. It is however preferred to use the pure monomer rather than the commercially available mixtures of vinyl aromatic monomers.

The resins are conveniently prepared by Fridel-Crafts catalysed polymerisation in which the mixture of cracked distillate and monovinyl aromatic monomer are treated with 0.25–2.5 wt. % of a catalyst such as aluminium chloride, aluminium bromide, or solutions, slurries or complexes thereof or borontrifluoride. These reactions are generally carried out at temperatures in the range 0° to 120° C., preferably 0° to 70° C. more preferably 20° to 55° C. the conditions being controlled to yield a resin of the required softening point. Residual catalyst is quenched by suitable methods such as addition of methyl alcohol and subsequent filtration followed by water and/or caustic washing. The final solution may then be stripped or unreacted hydrocarbons and low molecular weight oils by vacuum or steam distillation.

The resins contain from 10 to 30 wt. % of the monovinyl aromatic monomer, preferably from 15 to 25 wt. % and have a softening point from 10° C. to 80° C. The optimum softening point depends on the nature of the carboxylated latex with which it is to be used but we prefer it be in the range 30° C. to 60° C. since at higher softening points the adhesive properties can deteriorate whilst use of lower softening point materials can result in migration of the tackifier. The resins are conveniently supplied as aqueous emulsions and the emulsions may readily be produced by mixing with water and an anionic or nonionic emulsifier of the type described above or a mixture of both in relation to the carboxylated latex and obtaining the emulsion by inversion. We prefer that the emulsion contain about 50 wt. % of the resin. The emulsions may conveniently be obtained by the process described in our European Patent application No. 83300001.1.

The latex and the tackifier may be blended using conventional blenders to provide a homogenous mixture. The tackifier resin may be added to the latex in an amount of from about 20 to about 100 parts by weight per hundred parts of polymer in the latex, more, preferably the tackifier resins is added to the latex in an amount from about 50 to about 150 parts by weight per 100 parts of polymer in the latex. It is preferred that the tackifier be added to the latex as an aqueous emulsion to provide the amounts of tackifier resin per amount of polymer given above.

The adhesive compositions of the present invention may be applied to a substrate and then dried using conventional substrates and procedures. The substrate used depends upon the use envisaged but it is usually relatively thin material, usually no greater than about 3.2 mm in thickness and in the manufacture of tapes and labels the substrate is a relatively thin sheet material.

The sheet material may be a polymeric material which is flexible at about room temperature. The sheet material may be a homo-polymer of an ethylenically unsaturated monomer such as ethylene, propylene or vinyl chloride, or be polyester or polyamide provided it has sufficient flexibility for the desired end use. Alternatively the substrate may be made from cellulosic or reconstituted cellulosic material such as rayon. The substrate need not be a sheet material but may be composed of fibers which may be woven, or non woven as is the case in paper. Woven substrates may be made from cellulosic material, such as cotton or from fibers of any of the above mentioned polymers.

The composition is applied to the substrate using conventional coating techniques such as roller coaters, blade coaters, meyer rods or air coaters. The coated substrate is then dried usually by passing it through a heating tunnel or oven through which may be circulating hot air or the tunnel or oven may contain infrared lamps to dry the coated substrate. The drying time will be a function of a number of factors such as the heat capacity of the substrate, the type of heating, the oven temperature, air velocities (if circulating air is used) and the rate of passage of the substrate through the heater.

The substrate should be coated with sufficient composition to provide a dry coat weight from about 16 to about 57 g/cm$^2$. Generally in the manufacture of tapes using a contiuous sheet polymeric substrate a dry coat weight of about 15–30 g/m$^2$ is used. In the manufacture of labels a dry coat weight from about 15 to 30 g/cm$^2$ is usually used. In the manufacture of masking tape a dry coat weight from about 35 to about 65 g/cm$^2$ is usually used.

After drying the coated substrate is cut to the required dimension. In the manufacture of tape the substrate is cut into strips and rolled to provide a finished product. The substrate may also be cut into shaped items to provide labels or medicinal tapes.

The invention is illlustrated by the following Examples in which the feed used had the following composition.

| Component (Wt. %) | |
|---|---|
| C$_5$ paraffin | 1 |
| C$_5$ olefins | 22 |
| C$_6$ paraffins | 3 |
| C$_6$ olefins | 5 |
| C$_6$ diolefins | 3.5 |
| Isoprene | 14 |
| Pentadienes | 19 |
| CPD | 1.5 |
| Benzene | 31 |
| Total Olefins: | 27 |
| Total Diolefins: | 38 |

This feed was copolymerised with varying amounts of C$_5$ olefin streams and styrene using 7.5 grams of an aluminium trichloride catalyst at a temperature of 40° C. The feed and catalyst were added to the reactor over 45 minutes and left for a further 15 minutes, after polymerisation the materials wree hydrolysed, then neutralised with ammonium hydroxide, and stripped to remove volatiles.

The C$_5$ olefin stream used had the following compositions

| | C$_5$ Stream | | | |
|---|---|---|---|---|
| | 1 | 2 | 3 | 4 |
| C$_4$ Olefins + diol | — | — | — | 0.1 |
| 3-Me-butene-1 | 0.3 | 0.3 | 0.3 | 0.3 |
| Pentadiene 1.4 | — | — | — | 0.03 |
| i-Pentane | 2.5 | 2.6 | 2.75 | 2.2 |
| Pentene-1 | 2.3 | 2.3 | 2.45 | 1.9 |
| 2-Me-butene-1 | 6.3 | 6.2 | 6.5 | 5.0 |
| Isoprene | 0.2 | 0.2 | 0.2 | 0.1 |
| N—pentane | 8.7 | 8.2 | 8.4 | 6.3 |
| Pentene-2 trans | 23.4 | 22.1 | 22.55 | 17.4 |
| Pentene-2 cis | 8.5 | 8.0 | 8.0 | 6.6 |
| 2-Me-butene-2 | 27.7 | 26.0 | 26.2 | 20.5 |
| Pentadiene-1.3 tris & trans | 0.3 | 0.3 | 0.3 | 0.1 |
| CPD | 0.9 | 0.7 | 0.9 | 1.5 |
| Cyclopentene | 12.9 | 13.6 | 13.1 | 13.2 |
| Cyclopentane | 5.5 | 8.8 | 7.9 | 14.7 |
| C$_6$ Olefins | | | | 5.7 |
| C$_6$ Diolefins | | | | — |
| C$_7$ Olefins | | | | 0.3 |
| Benzene | | | | 0.5 |

The materials used and the properties of the resins obtained are set out below.

| EXAMPLE | A | B | C | D | E |
|---|---|---|---|---|---|
| Feed Composition (Gms) | | | | | |
| Feed | 150 | 150 | 200 | 220 | 300 |
| C$_5$ Olefins | 350 | 350 | 300 | 280 | 200 |
| | Stream 4 | Stream 4 | Stream 4 | Stream 3 | Stream 3 |
| Styrene | 25 | 25 | 25 | 35 | 35 |
| Olefins (gms) | 292 | 292 | 269 | 280 | 242 |
| Diolefins (gms) | 62 | 62 | 79 | 85.5 | 114 |
| Resin Properties | | | | | |
| Softening Point (°C.) | 60 | 44.5 | 43 | 42 | 60 |
| Styrene Content (wt. %) | 15.0 | 15.6 | 12.3 | 15.3 | 20.3 |
| Colour (Gardner) | 7 | 7.5 | 6.5 | 6 | 6 |
| Yield (wt. %) | 27 | 36.6 | 34.3 | 37.1 | 32.5 |
| EXAMPLE | F | G | H | I | |
| Feed Composition (Gms) | | | | | |
| Feed | 300 | 200 | 200 | 200 | |
| C$_5$ Olefins | 200 | 300 | 350 | 300 | |
| | Stream 1 | Stream 1 | Stream 2 | Stream 1 | |
| Styrene | 50 | 50 | 35 | 50 | |
| Olefins (gms) | 242 | 297 | 328 | 297 | |
| Diolefins (gms) | 114 | 78 | 78 | 78 | |
| Resin Properties | | | | | |
| Softening Point (°C.) | 65 | 51 | 50 | 39 | |
| Styrene Content (wt. %) | 22.1 | 22.3 | 22.2 | 23.3 | |

| -continued | | | | |
|---|---|---|---|---|
| Colour (Gardner) | 5+ | 6— | 6— | 6+ |
| Yield (wt. %) | 39.0 | 35.0 | 31.5 | 43 |
| EXAMPLE | J | K | L | M |
| Feed Composition (Gms) | | | | |
| Feed | 300 | 200 | 200 | 150 |
| $C_5$ Olefins | 200 | 300 | 300 | 350 |
| | Stream 1 | Stream 2 | Stream 2 | Stream |
| Styrene | 70 | 70 | 70 | 70 |
| Olefins (gms) | 242 | 288 | 288 | 317 |
| Diolefins (gms) | 114 | 78 | 78 | 61 |
| Resin Properties | | | | |
| Softening Point (°C.) | 70 | 53 | 44 | 40 |
| Styrene Content (wt. %) | 33.0 | 31.5 | 30.4 | 36 |
| Colour (Gardner) | 6— | 6— | 6 | 5 |
| Yield (wt. %) | 44 | 38.6 | 42 | 42 |

The resins were emulsified in an equal weight of water by the process of European Patent Application No. 83300001.1 using 5.5 parts of the commercially available emulsifier Atlox 3404Fb and their properties as tackifiers for carboxylated styrene butadiene copolymer rubber lattices determined by mixing 100 parts of the resin emulsion with 100 parts of the latex commercially available from Polysar as D93-703 (known as PL-3703) and that available from Doverstrand as 97D40. The adhesive system so obtained was coated onto "Mylar" (Registered Trade Mark) film to give a covering of 25 grams/square meter and the 180° peel strength, loop tack on metal and glass and the ball tack were measured as well as the shear on metal and the results compared with systems containing the commercially available Encorez 2101 aromatic modified $C_5$ resin of softening point 90°–95° C. and the hydrogenated rosin commercially available as Staybelite ester 10 and the modified rosin commercially available as Snowhite 52 CF.

The results were as follows:

| PRODUCT OF EXAMPLE | A | B | C | D | E | F |
|---|---|---|---|---|---|---|
| WITH DOVERSTRAND 97040 | | | | | | |
| 100° Peel Strength (g/cm) | 440 | 760 | 710 | 735 | 620 | 510 |
| Loop Tack metal (N/25 mm) | 5.0 | 13.0 | 10.5 | 8.0 | 5.6 | 5.8 |
| Loop Tack glass (N/25 mm) | 1.5 | 14.0 | 3.0 | 13.5 | 0 | 1.0 |
| Ball tack (cm) | >20 | 5 | >20 | 8 | >20 | >20 |
| Sheet on metal (hours) | 0.4 | 0.5 | 0.4 | 0.3 | 1.5 | 1.2 |
| WITH POLYSAR D93-703 | | | | | | |
| 100° Peel Strength (g/cm) | | 465 | 500 | 480 | | |
| Loop Tack metal (N/25 mm) | | 10.5 | 21 | 18.0 | | |
| Loop Tack glass (N/25 mm) | | 20 | 13.5 | 17.5 | | |
| Ball tack (cm) | | 1.5 | 2 | 1.5 | | |
| Sheer on metal (hours) | | 0.35 | 0.2 | 0.20 | | |

| PRODUCT OF EXAMPLE | G | H | I | J | K | L | M |
|---|---|---|---|---|---|---|---|
| WITH DOVERSTRAND 97040 | | | | | | | |
| 100° Peel Strength (g/cm) | 780 | 860 | 780 | 600 | 780 | 500 | 260 |
| Loop Tack metal (N/25 mm) | 9.8 | 11.2 | 7.6 | 50 | 8.2 | 5.6 | 2.0 |
| Loop Tack glass (N/25 mm) | 11.0 | 12.0 | 9.0 | 1.8 | 9.1 | 6.8 | 2.4 |
| Ball tack (cm) | 12.5 | 8 | 9 | >20 | >20 | >20 | 16 |
| Sheet on metal (hours) | 1.1 | 0.7 | 0.8 | 2.0 | 0.8 | 0.7 | 0.4 |

| PRODUCT OF EXAMPLE | G | H | I |
|---|---|---|---|
| WITH POLYSAR D93-703 | | | |
| 100° Peel Strength (g/cm) | 560 | 650 | 500 |
| Loop Tack metal (N/25 mm) | 18.5 | 14 | 15.0 |
| Loop Tack glass (N/25 mm) | 24 | 26 | 25 cf |
| Ball tack (cm) | 1.5 | 2 | 1.5 |
| Sheer on metal (hours) | 0.35 | 0.5 | 0.25 |

| COMPARATIVE TACKIFIER | Escorez 2101 | Staybelite Ester 10 | Snowhite 52CF |
|---|---|---|---|
| WITH DOVERSTRAND 97040 | | | |
| 100° Peel Strength (g/cm) | 630 | 660 | 700 |
| Loop Tack metal (N/25 mm) | 8.5 | 13.5 | 17 |
| Loop Tack glass (N/25 mm) | | | |
| Ball tack (cm) | >20 | 10 | 5.5 |
| Sheet on metal (hours) | 2.1 | 1.0 | 0.3 |
| WITH POLYSAR D93-703 | | | |
| 100° Peel Strength (g/cm) | 790 | 805 | 620 |
| Loop Tack metal (N/25 mm) | 16 | 16 | 17 |
| Loop Tack glass (N/25 mm) | 6 | 18 | 22 |
| Ball tack (cm) | >20 | 8.5 | 2.5 |
| Sheer on metal (hours) | 1.2 | 2.0 | 0.15 |

For comparison the properties of the carboxylated lattices when used on their own were.

|  | Doverstrand 970 40 | Polysar D93-703 |
|---|---|---|
| 180° C. Peel Strength g/cm | 400 | 280 |
| Loop Tack Metal (N/25 cm) | 7 | 3.4 |
| Loop Tack Glass (N/25 cm) | 6 | 6.5 |
| Ball Tack (cm) | 15 | 5.5 |
| Shear on Metal (hrs) | >200 | >200 |

The migration characteristics of some of the adhesives were determined by storing samples in an oven at 70° C. and 50% relative humidity for 3 weeks and making a visual examination after each week and rating the migration on a scale of 0 to 5, 0 being no migration and 5 the worst.

The results were as follows:

| Adhesive Formulation | 970-40 Plus D | DOVERSTRAND POLYSAR D93-703 Plus | | | | | | | Escorez 2101 | Stabelite Ester 10 | Snowhite 52CF |
|---|---|---|---|---|---|---|---|---|---|---|---|
|  |  | B | C | D | F | G | H | I |  |  |  |
| 1 week stage | 1 | 0 | 0 | 1 | 0 | 0 | 0 | 0 | 0 | 0 | 0 |
| 2 weeks stage | 1 | 1 | 1 | 1 | 0 | 0 | 0 | 1 | 0 | 0 | 1 |
| 3 weeks stage | 1 | 1 | 1 | 1 | 0 | 0 | 0 | 1 |  | 0 | 1 |

In a further example the ratio of latex to resin was varied using resins B and G with the following results.

| Parts Resin B | 50 | 100 | 150 | 50 | 100 | 150 |
|---|---|---|---|---|---|---|
| 100 parts Latex | POLYSAR D93 703 | | | DOVERSTRAND 970 40 | | |
| 180° Peel Strength (g/cm) | 780 | 500 | 550 | 730 | 600 | 560 |
| Loop Tack on Metal (10/25 mm) | 8.5 | 21 | 28 | 9.5 | 12.5 | 9.5 |
| Glass (10/25 mm) | 12.5 | 23 | 26 | 8.5 | 12 | 8 |
| Ball Tack (cm) | 2.5 | 1.5 | 1–1.5 | 3.5 | 5 | 16 |
| Shear PSTC-7 (Hours) | 1.35 | 0.20 | 0.10 | 1.05 | 0.50 | 0.35 |

| Parts of Resin G | 50 | 100 |
|---|---|---|
| Parts Polysar D93-703 | 100 | 100 |
| 180° Peel Strength (g/cm) | 560 | 660 |
| Loop Tack on Metal (N/25 mm) | 12.5 | 15.5 |
| Glass (N/25 mm) | 13 | 2.3 |
| Ball Tack (cm) | 2.5 | 0.40 |

We claim:

1. An adhesive emulsion comprising a homogenous mixture of 100 parts by weight carboxylated styrene butadiene polymer and an aqueous emulsion containing about 20 to 150 parts by weight of a resin having a softening point from 10° C. to 80° C., said resin comprising a Friedel-Crafts catalyzed polymerization copolymer of a feed comprising predominantly petroleum cracked distillate $C_5$ olefins and diolefins and one or more monovinyl aromatic compounds, said resin containing from 10 to 30 wt. % of the monovinyl aromatic compounds.

2. The carboxylated styrene butadiene polymer adhesive emulsion of claim 1 wherein said aqueous emulsion contains from about 50 to about 150 parts by weight resin.

3. The carboxylated styrene butadiene polymer adhesive emulsion of claim 1 wherein the monovinyl aromatic compound of said resin is styrene.

4. The carboxylated styrene butadiene polymer adhesive emulsion of claim 1 wherein said resin has a softening point in the range of from about 30° C. to about 60° C.

5. The carboxylated adhesive emulsion of claim 1 wherein said resin contains about 15 percent to about 25 percent by weight of the monovinyl aromatic compound.

* * * * *